Patented Mar. 2, 1926.

1,574,742

UNITED STATES PATENT OFFICE.

GEORGE W. ACHESON, OF CALDWELL, NEW JERSEY.

PROCESS OF REFINING AND DECOLORIZING BITUMENS.

No Drawing.    Application filed October 8, 1924. Serial No. 742,429.

*To all whom it may concern:*

Be it known that I, GEORGE W. ACHESON, a citizen of the United States of America, residing at 15 Forest Avenue, Caldwell, in the county of Essex and State of New Jersey, have invented certain new and useful Improvements in Processes of Refining and Decolorizing Bitumens, of which the following is a specification.

This invention relates to the refining of hydrocarbons, including mineral oils and waxes, shale oils and waxes, and similar substances, all of which will be collectively designated herein as "bitumens" which term is employed in its broad sense to include hydrocarbon bodies in general, and especially mineral oils, waxes, and the like, and products derived therefrom by distillation or otherwise. The present invention is a modification of, and improvement on, the process disclosed in my co-pending application Serial No. 732,112, filed August 14, 1924.

According to the present invention in its preferred embodiment, the hydrocarbon, as for example crude oil or a fraction therefrom, is first refined by subjection to the action of a reflocculated solid adsorbent material, preferably used in conjunction with an acid reagent, as described in my co-pending application above referred to. The liquid hydrocarbon is then separated from the precipitated matters or sludge, and subjected to a further treatment with an anhydrous oxid, preferably magnesia, or a material containing the same. The effect of this latter treatment, performed under these conditions, is to brighten and clarify the oil, and to remove much of the coloring matter.

My preferred solid adsorbent comprises clay, reprecipitated from the colloidal or deflocculated state, and is preferably prepared in the manner disclosed in the prior patents to E. G. Acheson, Numbers 1,456,111 and 1,456,112, patented May 22, 1923. As more fully explained in the aforesaid Patent 1,456,112, the term "deflocculation" is employed herein to indicate a subdivision of matter brought about through the agency of certain organic bodies known in this art as "deflocculating agents". When such deflocculating agents are incorporated with the body to be deflocculated, the latter in presence of a sufficiently restricted body of water or other liquid, and the resulting heavy paste is subjected to prolonged mechanical working, the component particles, or a portion of them, undergo deflocculation with the result that they are subdivided into extremely minute masses, which in some cases at least are now believed to be of molecular dimensions. Such deflocculated particles are beyond the limits of visibility under ordinary microscopic observation, but appear under the ultra-microscope as brilliant points in intense vibratory movement. Processes of deflocculation and deflocculating agents for use in connection therewith are disclosed in many prior patents to E. G. Acheson, among which may be mentioned U. S. 1,223,350 of April 24, 1917 as disclosing a preferred mechanical method of effecting the defloccultion; U. S. 1,253,556 of January 15, 1918 and 1,345,305 of June 29, 1920 as disclosing preferred deflocculating agents; and U. S. 1,345,306 of June 29, 1920 as disclosing the preferred moisture relations, in the deflocculating process. However the deflocculation may be accomplished, the deflocculated or colloidal particles may be precipitated from their solution or suspension (reflocculated) by the addition of small proportions of electrolytes such as hydrochloric acid, alum or the like. The particles are thereby precipitated in the form of fragile and porous aggregates, which present enormous surfaces relative to their weight.

In one particular embodiment of my invention I proceed as follows, it being understood that my invention is not restricted to the specific materials, proportions, or manipulations described by way of example; for as will readily be understood these conditions must be varied according to the particular raw material to be treated and the object sought to be attained.

A mid-continent pipe-line crude oil was thoroughly agitated at ordinary temperature with about 10% by weight of refloccu- lated clay, prepared as described above by precipitation from the deflocculated suspension and thereafter dried and calcined at about 550° C. After a sufficient time for thorough mixing, a like proportion by weight of 66° Bé. sulfuric acid was slowly added, the agitation being continued until a complete coagulation of the clay and tarry matter had taken place, and the precipitate had gathered into sufficiently large masses to permit rapid subsidence. The mixture was then permitted to stand to permit complete subsidence of the clay-tar precipitate, which subsidence takes place quite rapidly, especially when the calcined clay is introduced in the form of particles of considerable size, say up to pea-size or even larger. Under these conditions the acid is largely adsorbed or neutralized by the clay, so that the hydrocarbon, decanted or otherwise separated from the sludge or precipitate, will be found nearly neutral.

Instead of reflocculated and calcined clay, I may employ at this refining stage of the operation, and also in the second or decolorizing stage now to be described, any other solid adsorbent, possessing similar properties. For example I have obtained excellent results with fuller's earth, deflocculated, reflocculated and calcined in the manner described above; and also with certain non-crystalline forms of silica and siliceous material similarly treated. I employ the expression "solid adsorbent" therefore to designate my reflocculated clay product, and such other solid adsorbents as act in a similar manner and can replace it in this process.

The clarified and nearly neutral oil separated from the sludge or precipitate is now treated with an anhydrous oxid in proportion to remove the color to the extent desired. Magnesia is the most effective of any of the oxids which I have used, but appreciable effects are obtainable with other anhydrous oxids, especially alumina and ferric oxid. The proportion of oxid to be employed will of course depend upon the nature of the oil or other bitumen, and the degree of decolorization desired, being less as a rule with distillates and greater with crudes. In some cases I have used with advantage magnesia to the extent of 15% or even 20% by weight of the oil; but much smaller proportions than this will often decolorize the oil to the desired extent; hence my invention is not restricted to the employment of the oxid in any particular proportions.

As stated above the anhydrous oxid may be used alone: but I have obtained the best results by using magnesia in the form of highly calcined heavy oxid in admixture with a reflocculated solid adsorbent of the same nature as that employed in the first or refining operation. For this purpose I now prefer to use reflocculated clay, which has been calcined at a rather higher temperature than that used in preparing the clay for the refining step. Calcining temperatures of the order of 650° C., under strongly oxidizing conditions, have proven satisfactory in practice. The magnesia or other anhydrous oxid may be mixed with the clay or other solid adsorbent in the proportion of 15—50 percent of the mixture, more or less, according to the nature of the hydrocarbon to be treated and the character of the effect desired. If desired the magnesia may be incorporated with the clay or other solid adsorbent before the latter is calcined, and calcined with it.

My process is applicable both to sulfur-bearing and non-sulfur-bearing oils. As will be understood from the foregoing description, the process is carried out in two steps or operating stages, the first being conveniently regarded as the refining stage, and the second as the decolorizing stage. If sulfur is present, its removal or partial removal takes place principally during the refining stage as described in my co-pending application above referred to. As further explained in the said application, any reagent capable of aiding the adsorption of sulfur by the solid adsorbent is to be regarded as the equivalent of sulfuric acid for the purposes of this invention.

Following the decolorizing treatment, the oil is filtered, and is ready for distillation into appropriate fractions, or for use, as the case may be.

My process is to be clearly distinguished from prior proposals to use anhydrous oxids, including magnesia, for the neutralization of acid treated oils. In such cases no substantial decolorizing effect is sought or obtained.

In the case of certain oils a material refining effect may be obtained by the use of the solid adsorbent substance, as calcined reflocculated clay, without the addition of sulfuric acid or any equivalent reagent. Accordingly my invention is not restricted to the employment of acid during the refining stage, although such employment constitutes my preferred procedure.

I claim:

1. Process of refining and decolorizing bitumens comprising reacting thereon with a solid reflocculated adsorbent material in conjunction with an acid reagent, separating the refined bitumen from the acid sludge, and further treating the same with an anhydrous oxid having a decolorizing action thereon.

2. Process of refining and decolorizing bitumens comprising reacting thereon with a solid reflocculated adsorbent material in conjunction with an acid reagent, separating the refined bitumen from the acid sludge, and further treating the same with a material containing magnesium oxid.

3. Process of refining and decolorizing bitumens comprising reacting thereon with a solid reflocculated adsorbent material in conjunction with an acid reagent, separating the refined bitumen from the acid sludge, and further treating the same with a solid adsorbent admixed with an anhydrous oxid having a decolorizing action on the bitumen.

4. Process of refining and decolorizing bitumens comprising reacting thereon with a solid reflocculated adsorbent material in conjunction with an acid reagent, separating the refined bitumen from the acid sludge, and further treating the same with a reflocculated solid adsorbent material admixed with an anhydrous oxid having a decolorizing action on the bitumen.

5. Process of refining and decolorizing bitumens comprising reacting thereon with a solid reflocculated adsorbent material in conjunction with an acid reagent, separating the refined bitumen from the acid sludge, and further treating the same with a reflocculated clay admixed with magnesium oxid.

6. Process of refining and decolorizing bitumens comprising reacting thereon with a solid reflocculated adsorbent material, separating the bitumen from the resulting precipitate, and further treating the same with an anhydrous oxid having a decolorizing action thereon.

7. Process of refining and decolorizing bitumens comprising reacting thereon with a solid reflocculated adsorbent material, separating the bitumen from the resulting precipitate, and further treating the same with a material containing magnesium oxid.

8. Process of refining and decolorizing bitumens comprising reacting thereon with a solid reflocculated adsorbent material, separating the bitumen from the resulting precipitate, and further treating the same with a solid adsorbent admixed with an anhydrous oxid having a decolorizing action on the bitumen.

9. Process of refining and decolorizing bitumens comprising reacting thereon with a solid reflocculated adsorbent material, separating the bitumen from the resulting precipitate, and further treating the same with a reflocculated solid adsorbent material admixed with an anhydrous oxid having a decolorizing action on the bitumen.

10. Process of refining and decolorizing bitumens comprising reacting thereon with a solid reflocculated adsorbent material, separating the bitumen from the resulting precipitate, and further treating the same with a reflocculated clay admixed with magnesium oxid.

In testimony whereof, I affix my signature.

GEORGE W. ACHESON.